United States Patent [19]
Golibersuch

[11] 3,742,348
[45] June 26, 1973

[54] NOISE FREE SMALL PARTICLE ANALYSIS

[75] Inventor: David C. Golibersuch, Schenectady, N.Y.

[73] Assignee: General Electric Company, Schenectady, N.Y.

[22] Filed: Oct. 19, 1970

[21] Appl. No.: 81,825

[52] U.S. Cl. .......... 324/71 CP, 73/432 PS, 204/299
[51] Int. Cl. ............................................ G01n 27/00
[58] Field of Search ..................... 324/71 R, 71 CP, 324/30; 235/92 PC; 73/432 PS; 204/299

[56] References Cited
UNITED STATES PATENTS
3,259,842   7/1966   Coulter ........................... 324/71 CP Primary Examiner—Michael J. Lynch
Attorney—John F. Ahern, Paul A. Frank, Richard R. Brainard, Jerome C. Squillaro, Frank L. Neuhauser, Oscar B. Waddell and Joseph B. Forman

[57] ABSTRACT

Certain characteristics, e.g., electrophoretic mobility and number or volume of particles in an electrolyte may be measured according to a method which successfully eliminates the effect of system thermal noise. Nonconducting particles are urged through a pore in a nonconducting membrane by, for example, an electric field. Such passage causes the resistance of the pore to vary with time and, via a suitable electrical circuit, results in a time varying voltage being developed across a load. This voltage is sensed and a function is computed, which function is the time average of the product of the voltage $V(t)$ at time $(t)$ and the voltage $V(t + \Delta t)$ at some delayed time $(t + \Delta t)$ for one or more values of the delay time $(\Delta t)$. The resultant function is closely indicative of certain characteristics, e.g., electrophoretic mobility and number or volume of particles of a given specie, and is able to represent characteristics of several specie in the same measurement.

8 Claims, 5 Drawing Figures

INVENTOR:
DAVID C. GOLIBERSUCH,
by John F. Ahern
HIS ATTORNEY

NOISE FREE SMALL PARTICLE ANALYSIS

The present invention relates to the measurement and analysis of characteristics of small particles. More particularly, the invention is directed to such measurement as performed upon large numbers thereof, as opposed to individual particles, and eliminates the effects of system thermal noise.

The measurement of small particles and analysis of parameters thereof is a problem having a wide degree of application. Thus, for example, in medical research, the analysis of blood for certain bodies such as lipoproteins and the detection and identification of virus cells are of great importance. Additionally, in other fields, the detection and identification of small particles, as for example, impurities in effluents and certain undesirable particles in liquid streams, as in nuclear reactor coolants, is of great concern.

Prior art measuring techniques and apparatus are generally not able to detect very small particles with accuracy. System thermal noise, i.e., interfering internally generated signals which mask the signal sought to be detected and analyzed, makes measurement of particles as small as 150 A.U. difficult, and smaller particles, impossible.

In general, the determination of particle parameters may be carried out by forcing or urging particles through small pores in a solid or membrane wall between two compartments containing an electrolyte in which the particles are suspended. The particles may be urged by a variety of forces. According to one method, a differential in hydrostatic pressure may be utilized. an electric another, anelectric field developed between respective electrodes in the different cells moves the particles. Other forces which may be utilized include magnetic forces, centrifugal forces, and gravitational forces, for example.

My invention relates to a method of measuring and analyzing the parameters of the particles and may be practiced with any such method, so long as the impedance of the pore is detectable and an electrical current is passed through the pore, such that the passage of particles therethrough alters the impedance of the pore and develops a voltage signal across a load in series with the pore.

For brevity, and in order to develop the general principles of my invention, it will be described herein with reference to the method of electrophoretically urging particles through a pore in a membrane.

One such system for the detection of small particles and their identification is set forth in the co-pending application of Bean and DeBlois, Ser. No. 13,115 filed Feb. 20, 1970, and assigned to the present assignee. According to the Bean and DeBlois method, single particles are electrically urged through a pore in a nonconducting membrane suspended in an electrolyte and the resultant resistance change causes a load to develop a voltage which is indicative of the electrophoretic mobility of the particle and the size thereof. An earlier system, that of Coulter U.S. Pat. 2,656,508, relied on a hydrostatic pressure difference across a pore to drive the particles through and thus was limited to determination of particle size only. Although the Bean and DeBlois method and apparatus is a great improvement upon previous methods and apparatus, it is likewise directed to single particle measurement. That is, the concentration of particles suspended in the electrolyte must be low enough that the average number of particles in the pore at any time is less than one. The simultaneous passage of a number of particles through the pore or aperture used to measure the parameters of a single particle results in a plurality of individual particle signals which are inseparable and which, viewed in the aggregate, results in an unintelligible signal. Furthermore, the sensitivity of the single particle type analysis technique and apparatus is generally dependent upon the closeness of the particle diameter to the value of the pore diameter, which generally effectively limits the range of particle sizes which may be detected with a given pore.

Accordingly, it is an object of the present invention to provide a method for analyzing and measuring characteristics of particles in liquid solution which eliminates the effects of system thermal noise.

Another object of the invention is to analyze the characteristics of a concentrated particle suspension.

Still another object of the present invention is to analyze the characteristics of several species of particles in a common suspension simultaneously.

Yet another object of the invention is to provide an improved sensitivity method of analyzing and measuring the characteristics of small particles in solution.

Briefly stated, in accord with one embodiment of the present invention, the characteristics of a concentrated particle suspension are analyzed and measured by passing the particles electrophoretically through a small diameter pore in an insulating membrane immersed in an electrolyte. Such passage causes the resistance of the pore to vary with time, which in turn causes the voltage across a load to vary in time. This voltage is correlated against a delayed image of itself for various delay times. The characteristics of the average correlation function so obtained identify the electrophoretic mobility and concentration or size of the particles sought to be analyzed. These measurements are made more rapidly and with sensitivity and reliability consistent with the analysis of particles as small as 50 A.U. in diameter.

The novel features characteristic of the present invention are set forth in the appended claims. The invention itself, together with further objects and advantages thereof, may best be understood by reference to the following detailed description of one embodiment employing electrophoretic drive of the particles, taken in connection with the attached drawing in which;

In general, electrical measurements for the characterization of small particles using small pores as measuremrnt means begins with the known electrical impedance through a pore in a membrane suspended in an electrolyte. Once a characteristic impedance for the flow of electricity through the pore has been determined, the presence of a particle while passing therethrough changes the resistance of the pore due to its physical presence therein and its effect upon the resistance is indicated by a voltage pulse which may be observed as a change in voltage across a load impedance in series with the electrical path through the pore. The magnitude of the pulse depends upon the relative sizes of the particle and the pore and is expressed by the formula $$\Delta R = (4 \rho d^3 / \pi D^4)$$

where $\Delta R$ is the change in pore resistance, $\rho$ is the resistivity of the electrolyte, $d$ is the diameter of the particle being measured and $D$ is the pore diameter. The electrophoretic mobility of the particle $\mu$ may be deduced from the transit time ($\tau\tau$) which is the pulse duration of the particle as it traverses the pore under an applied electric field.

Figure 1:
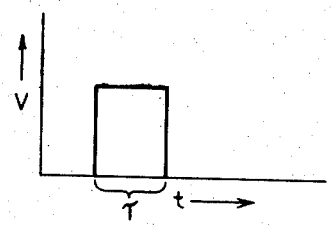
FIG. 1 is an idealized graphic representation of a voltage pulse indicative of a single particle characteristic as detected in one system and method of the prior art.

In FIG. 1 of the drawing, the ideal characteristic of a voltage pulse caused by such a passage is indicated with the voltage developed across the load plotted as ordinate and the time as abscissa. Not shown are the random voltage fluctuations (thermal noise) which are always present and in general obscure the characteristic of the particle-produced signal. It is noted that a pulse having a time pulse width $\tau$ and a voltage magnitude $V$ results from the passage of a particle through the pore. According to the above, it may be determined what size and mobility of the particle are since the mobility is inversely proportional to the pulse width, and the cube of the particle diameter is proportional to the voltage developed by the passage of the particle (i.e., $V$).

Figure 2:
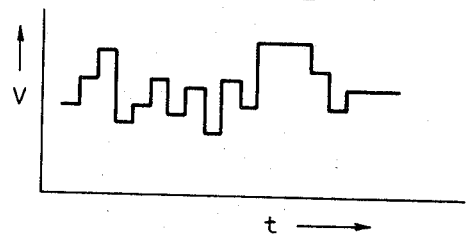
FIG. 2 is an idealized graphic representation of a voltage signal due to the passage of a plurality of particles, as seen by the prior art apparatus.

If a concentrated suspension of particles is passed through a single pore, as with the single particle as illustrated in FIG. 1, and the voltage developed thereby observed on an oscilloscope, the idealized trace of FIG. 2 is observed. Each step in this trace is indicative of a particular particle entering or leaving the pore. Not shown are the random voltage fluctuations (thermal noise) which are always present and which generally would obscure the steps shown in FIG. 2. It is readily apparent from this discussion and examination of FIG. 2 that using prior art detection methods, no directly obtainable information is present in such a signal. This is because the overlapping of the plural individual signal, and further due to random thermal noise. In accord with the present invention, I am able to take such a signal and obtain a characterization thereof which yields the desired information.

Figure 3:
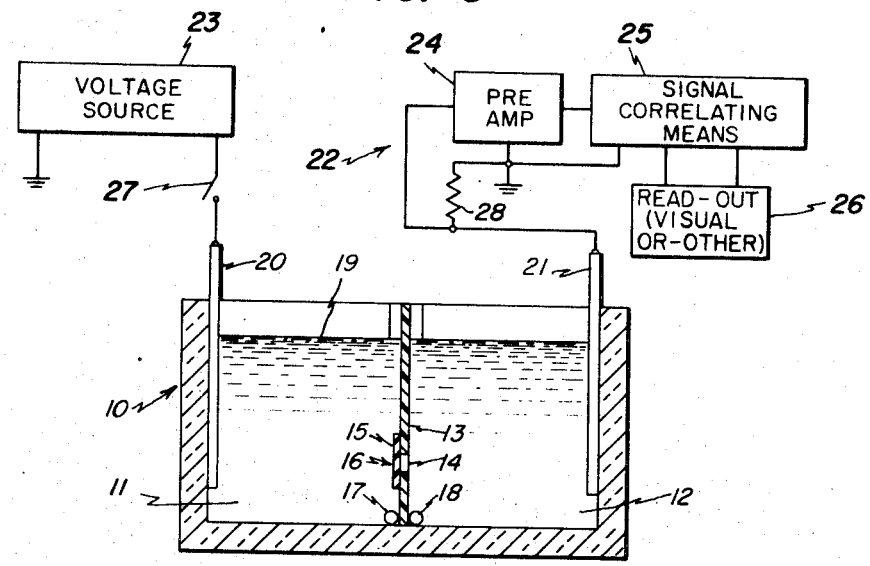
FIG. 3 is a schematic representation of an apparatus suitable for analyzing and measuring a plurality of particles in accord with the present invention.

In accord with the present invention, a system, illustrated schematically in FIG. 3 is utilized. In FIG. 3, a container or cell 10 is divided into chambers 11 and 12 by partition 13. Container 10 and partition 13 are preferably formed of a substantially non-porous insulating material such as ceramic, plastic, glass or plexiglass. The partition 13 has an aperture 14 therein covered by a membrane 15 with a pore 16 of a suitable size produced therein in a manner known to the art, for example, by selective etching of material damaged by the passage of a high velocity ionizing particle therethrough as is described in greater detail in U. S. Pat. No. 3,335,278 to Price et al. Membrane 15 is attached to the partition 13 by a suitable means, such as epoxy cement or other suitable adhesive. Partition 13 is mounted to the walls of the container 10 by suitable fixtures as for example, O rings 17 and 18. Such mounting makes the membrane removable so that the pore diameter may be changed or the membrane replaced, should it become punctured or otherwise unusable.

Compartments 11 and 12 of container 10 are filled with an electrolyte solution 19 such as potassium chloride, sodium chloride, dilute hydrochloric acid, sodium hydroxide for any other electrolyte solution wellknown to the art, including buffering additives, if desired, and also, if desired, a non-ionic or ionic surfactant to minimize clogging of the pore.

The solution levels of the two components are adjusted to be substatially the same, so that substantially no hydrostatic pressure differential exists therebetween. To provide for electrical conduction through the electrolyte solution and through the membrane 16, electrodes 20 and 21 are positioned within chambers 11 and 12, respectively. In external electrical circuit 22 includes a voltage source 23, a load impedance 28, which may be adjusted to a previously determined value, a preamplifier 24, a signal correlating means 25, and read-out or display means 26. Alternatively, display means 26 may be removed and electronic computer means or other means for sensing, recording and/or storing the voltage function developed by signal correlating means 25 may be substituted therefor. The circuit may be changed from an operative to an inoperative position by a switching means indicated schematically at 27.

Upon closing switch 27, electric current is caused to flow through the electrolyte between electrodes 20 and 21. When a time-varying voltage is developed across resistance 28 by virtue of the passage of particles through pore 16 in membrane 15, the voltage function is amplified and presented to the signal correlating means. In the instance of a complex voltage signal including thermal noise and also including the signals due to the passage of a plurality of particles, ordinary signal amplification and voltage detection means would provide an output as discussed in relation to FIG. 2. Suitable correlation analysis of the voltage function brings intelligence out of such an unintelligible signal.

Expressed very simply, the pertinent signal correlation function is obtained by multiplication of the time varying voltage signal against a delayed image of itself to obtain a voltage squared as a function of delay time. Operationally, the products of the voltage $V(t)$ at some time $(t)$ and the voltage $V(t + \Delta t)$ at some later time $(t + \Delta t)$ are computed for many different times. The correlation function $\overline{V(t)V(t + \Delta t)}$ for the delay time ($\Delta t$) is then the average of all these products.

Figure 4:
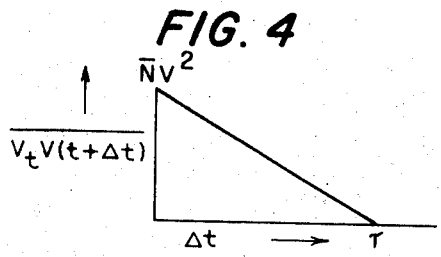
FIG. 4 is a graphic the described of thedescribed voltage correlation function of a plurality of a single specie of particle as detected by the process of the present invention.

FIG. 4 of the drawing represents a correlated voltage function obtained by correlating a signal such as that illustrated in FIG. 2 of the drawing against itself in the manner described as a function of the delay time $\Delta t$. The plot of FIG. 3 is that of a correlated voltage function $\overline{V(t) \cdot V(t + \Delta t)}$ plotted as ordinate with $\Delta t$ plotted as abscissa. Not shown is a spike at $\Delta t = 0$ which results from the random thermal noise. The significance of the plot which is independent of noise is that the intercept of the function along the axis of ordinates is representative of $\overline{N} V^2$ where $\overline{N}$ is the average number of particles in the pore and $V$ is proportional to the size of the particles and $\tau$, the intercept of the plot with the axis of abscissas, is indicative of the mobility of the particles.

The reason that the correlation function illustrated in FIG. 4 of the drawing is independent of random thermal noise is that the product of random signals $V(t)$ and $V(t + \Delta t)$ averaged over all $(t)$ is equal to 0 except for $\Delta \tau = 0$. Therefore, the voltage correlation function illustrated in FIG. 4 is indicative of the mobility and concentration (or size) of the specie of the plurality of particles passing through the pore, independent of thermal noise.

Figure 5:
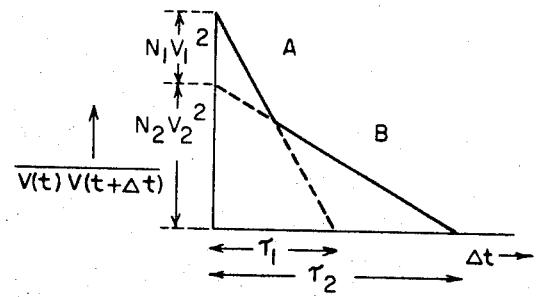
FIG. 5 is a graphical representation of the described correlation voltage function of a plurality of particles of two different species which are measured simultaneously in accord with the present invention.

In further accord with the present invention, I am able to characterize a plurality of species of particles simultaneously by the same measurement. In FIG. 5 of the drawing, I illustrate a voltage correlation function obtained utilizing the system as illustrated in FIG. 3 of the drawing and in which two different specie of particles have been added to the solution in one electrolyte chamber 11 in the apparatus, and the passage of both species of particles through the pore has been indicated electrically. In FIG. 5, the slope and intercepts of Curve A characterized particles of specie 1 and the slope and intercepts of Curve B characterize the particles of specie B. Thus, the intercept of Curve A with the axis of ordinates is indicative of $\overline{N}_1 V_1^2$ and the extrapolated intercept of Curve B with the axis of ordinates is indicative of the quantity $\overline{N}_2 V_2^2$ while the extrapolated intercept of Curve A with the axis of abscissas is indicative of $\tau_1$ and the intercept of Curve B with the axis of abscissas is indicative of $\tau_2$. From the earlier discussion, $\tau_1$ and $\tau_2$ proportional to $\mu_1$ and $\mu_2$, respectively, the mobilities of the respective species of particles.

A single visual measurement taken in accord with the technique described hereinbefore, may be made in approximately three minutes. Obviously, such rapid and accurate noise free measurements are of great advantage, particularly in the medical arts where time may be a significant feature and rapid measurement may be of great significance.

The correlation operation may be performed in a variety of ways. One technique is to convert the analog voltage signal, as exemplified in FIG. 2, to a discrete sequence of voltages $V(t_i)$ in digital form as would be suitable for mathematical processing, as for example, by electronic data processing facilities. The correlation function of $V(t)$ could then be obtained with the aid of a program designed to compute $$\overline{V(t)V(t+\Delta t)} = \frac{\sum_i V(t_i)V(t_i+\Delta t)}{\sum_i 1}$$

for a suitably large number of points $i$.

An alternative method is to multiply continuously and electronically the signal by a version of itself delayed by a time $\Delta t$, which version is obtained by passing the signal through an electronic delay line. The resultant continuous product is then averaged and stored for later readout in a suitable RC circuit to obtain $\overline{V(t)V(t+\Delta t)}$ for one delay time $\Delta t$. To obtain the correlation function $\overline{V(t)V(t+\Delta t)}$ for several delay times simply requires several delay lines (or several taps on one delay line) and several multipliers and several RC averaging and storing circuits. These functions may be performed, for example, by an instrument manufactured by Princeton Applied Research of Princeton, New Jersey, and identified as PAR Model 100 Signal Correlator.

In the simplest operation in accord with the present invention, the complete analysis described above may be unnecessary. Thus, for example, it is possible to obtain a comparative indication of the quantity $\overline{N} V^2$ from the quantity $\overline{V(t)V(t + \Delta t)}$ for the case $\Delta t = 0$. This quantity $\overline{V(t)V(t)}$ is the mean square voltage and may be simply determined with the aid of a true RMS voltmeter. To determine $\overline{N} V^2$ in this way, two measurements are necessary. First the mean square voltage is determined with particles being driven through the pore and from this is subtracted the mean square voltage determined with only electrolyte in the pore (i.e., the mean square voltage due to thermal noise only) to yield $\overline{N} V^2$. This measurement is valid for any means of driving particles through the pore, for example, electrophoresis or hydrostatic pressure difference.

Since single particle measurement devices and methods are dependent, for sensitivity, upon causing the particle pore to be as small as possible and, in the limit, approaching the diameter of the particle being measured, such devices are limited in sensitivity by the pore size obtainable. Additionally, as the size of the pore approaches the size of the particle, clogging and obstruction of the pore becomes a more serious problem. Additionally, as the pore size decreases, the resistance of the pore increases and, correspondingly, the random thermal noise increases in a manner well-known. In accord with the present invention, the sensitivity is not dependent upon the pore size and it is possible to make measurements into the molecular realm of less than 150 A.U. The present system is consistent with the measurement of proteins and other particles extending to diameters of the order of 50 A.U. A further advantage of the sensitivity determinant of the present invention is that, getting away from extremely small pores minimizes the pore clogging problem. Thus, since the use of a large pore can be advantageous, pores made by a variety of methods, other than by particle track etching, are, in many instances, suitable. Additionally, since ultimate sensitivity of this measurement system is not limited by thermal noise originating in the pore and the associated electronics, but rather by signals caused by ion pair fluctuations in the electrolyte, appropriate control of the electrolyte makes the attainment of much more sensitive, and hence, more accurate, measurement readily obtainable.

While the invention has been described generally hereinbefore in order that those skilled in the art may obtain greater insight into the means of practicing the invention, the following examples are set forth by way of example and are not to be construed in a limiting sense.

EXAMPLE I

A single pore membrane of length 10 micron and diameter 0.4 micron was fabricated using an etched particle track in Makrofol polycarbonate film. The membrane was inserted between two electrolyte baths each of which contained approximately one cubic centimeter. The electrolyte chosen was 0.1 M KCl plus a small amount of non-ionic surfactants Surfanol TG and Triton 155-X. The resistance of the pore was determined to be 42 megohm. The cell was placed in series with a battery voltage supply and a 1000 megohm load resistor, thus forming a constant current system. The liquid level in the cells was adjusted so that the hydrostatic pressure difference across the pore was essentially zero. One microliter of a 10 percent suspension of 0.23 micron diameter polystyrene spheres was then introduced into the electrolyte bath on one side of the pore. The battery supply was the turned on and adjusted to develop 1.95 volts across the pore (corresponding to a voltage gradient of 1950 volts/cm). In this example, the time varying voltage appearing across the cell was capacitively coupled to a Tektronix Model 1A70 preamplifier. The amplified signal was then applied to the input of a PAR Model 100 Signal Correlator with an RC constant equal to 20 seconds. The desired correlation function was averaged for about 90 seconds and the resultant correlation function was then permanently recorded on linear graph paper using an X-Y recorder. The X intercept was determined to be $\Delta t = 14$ milliseconds corresponding to a mobility $= 0.37 \times 10^{-4} cm.^2/volt.sec$. The Y intercept (proportional to $\overline{N} V^2$) was also noted. The concentration of spheres in the electrolyte was then increased by a factor of three and the procedure was repeated. Again the X intercept was determined to be $\Delta t = 14$ milliseconds, implying an unchanged mobility. However, the Y intercept was increased by a factor of three reflecting the change in concentration N.

EXAMPLE II

A membrane was fabricated from a slice of drawing glass capillary tubing. The pore is of length 100 micron and diameter 5 micron. The membrane was installed in the cell and a 0.1 M KCl electrolyte plus a small quantity of non-ionic surfactant Surfanol TG and Triton 155-X was introduced. The impedance of the pore was determined as 3.5 megohm. The pore was then connected in series with a battery voltage supply and a load resistor of 40 megohms. The voltage supply was then adjusted to develop 10 volts across the pore. The electrolyte was then driven through the pore with a small hydrostatic pressure difference of 5 inches of $H_2O$. The variable voltage developed across the load resistor was then capacitively coupled to high impedance preamplifier PAR Model 113, and the amplified signal applied to a Ballantine Laboratories, Inc. Model 323-01 True RMS Voltmeter. The RMS voltage was observed and recorded. Next, 5 microliter of 10 percent solution of 1.1 micron diameter polystyrene spheres was introduced and again the true RMS voltage recorded. Next, the square of the first voltage was computed and subtracted from the square of the second voltage and this number was recorded as a measure of $\overline{N} V^2$ for this suspension. This procedure was then repated for a 5 microliter of 10 percent suspension of 0.5 micron diameter spheres. The new value of $\overline{N} V^2$ was found to be only 0.009 times the value obtained for the 1.1 micron diameter spheres corresponding to the ratio of $\overline{N} V^2$ as $[(0.5/1.1)^3]$. While a relative measurement is described here, it is but a matter of detail to calibrate the instrument system to obtain absolute measurements.

By the foregoing, I have described a new and improved method for the measurement and analysis of electrical signals for the determination of parameters of small particles which permits the measurement of a plurality of particles at the same time and an obtainment of certain characteristics, for example, mobility and number or volume thereof. This method is superior to the methods of prior art in that the ultimate sensitivity is greater and the reliability, likewise, is greatly improved over that of the prior art.

While the invention has been set forth with regard to certain specific embodiments thereof, many modifications and changes will readily occur to those skilled in the art. Accordingly, by the appended claims, I intend to cover all such modifications and changes as fall within the true spirit of the invention as described herein.

What I claim as new and desire to secure by Letters Patent of the United States is:

1. A method of analyzing a plurality of small particles in the micron or sub-micron range, which method comprises the steps of:
   a. driving a suspension of said particles in an electrolyte through a pore of a predetermined diameter in a nonconducting membrane of a predetermined thickness to cause a time variable change in the resistance of said pore;
   b. passing a current through a load in series with said pore so that the variations in pore resistance cause a time varying voltage signal to develop across the load;
   c. measuring and analyzing said voltage signal and determining therefrom the characteristics of said particles while simultaneously eliminating the effects of thermal noise signals generated during the measure-ment process,
   said measuring and analyzing step including computing of a correlation function which is a time average of the product of the voltage $V(t)$ and the voltage $V(t + \Delta t)$ computed for a plurality of values of the delay time $\Delta t$.

2. The method of claim 2 wherein the correlation function is determined for the delay time $\Delta t = 0$, and where such measurement is indicative of $\overline{N} V^2$.

3. The method of claim 1 wherein said computing of a correlation function comprises the steps of:
   a. applying said voltage signal to a first input means of a multiplier circuit and to an input means of a delay circuit electrically in parallel, said delay circuit having a delay time $\Delta t$;
   b. applying an output signal from said delay circuit to a second input means of said multiplier circuit, said multiplier circuit providing an output proportional to the product of said voltage signal and said output from said delay circuit; and
   c. storing said output of said multiplier circuit. measuring and 4. The method of claim 2 wherein said measuring and analyzing step includes: applying said voltage signal to input means of a true RMS voltmeter.

5. The method of claim 2 wherein said measuring and analyzing step includes additionally the steps of:
   a. defining a linear scale by a of Cartesian ofCartesian co-ordinate axes comprising one axis of ordinates and one axis of abscissas;
   b. plotting said correlation function upon said linear scale; and
   c. determining an ordinate value for an intersection between said correlation function and said axis of ordinates, and an abscissa value for an intersection between said correlation function and said axis of abscissas, said ordinate value being indicative of theproduct $\overline{N}V^2$ where $\overline{N}$ is the average number of particles in the pore and $V^2$ is the square of said voltage signal and said abscissa value is indicative of the transit time $\tau$ of said particles through said pore.

6. The method of claim 5 wherein said particles are electrophoretically urged through said pore by a known potential gradient and electrophoretic mobility $\mu$ of said particles is determined from said abscissa value and said known potential gradient.

7. The method of claim 6 wherein said linear plot is displayed for visual observation.

8. The method of claim 6 wherein said particles are inclusive of a plurality of species and said plot indicates a plurality of slopes with corresponding intercepts with each slope and the intercepts associated therewith characterizing a species of particles.

* * * * *